United States Patent Office 3,535,330
Patented Oct. 20, 1970

3,535,330
2,6-DIPHENYL - 4 - [p-(DILOWER-ALKYL AMINO LOWER - ALKOXY)PHENYL]PYRIDINES AND DERIVATIVES THEREOF
Rudolf G. Griot, Basel-Stadt, Switzerland, assignor to Sandoz-Wander, Inc., Hanover, N.J.
No Drawing. Continuation-in-part of application Ser. No. 725,171, Apr. 29, 1968. This application Mar. 28, 1969, Ser. No. 811,676
Int. Cl. C07d 31/42
U.S. Cl. 260—296                17 Claims

ABSTRACT OF THE DISCLOSURE

This invention relates to 2,6-dicyclosubstituted-4-[p-(ω - aminoalkoxy)phenyl]pyridines useful as hypolipidemics, and to preparation of such compounds involving key novel intermediates which are 4-(ω-aminoalkoxy)chalcones.

---

This application is a continuation-in-part of my copending application Ser. No. 725,171, filed Apr. 29, 1968.

The present invention relates to 2,6-cyclosubstituted-4-[p-(ω-aminoalkoxy)phenyl]pyridines and methods of preparing the same. The invention also relates to intermediates useful in preparation of such compounds and to processes for preparing said intermediates.

The substituted pyridines of the present invention are from the group of:

(A) compounds of the following structural Formula I:

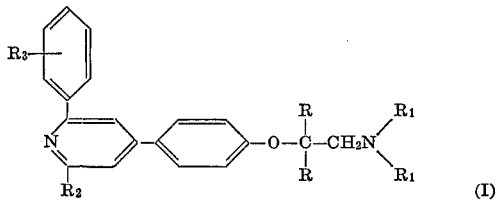

wherein each of R is, independently, hydrogen or lower alkyl of not more than 4 carbon atoms;
each of $R_1$ is, independently, lower alkyl or both $R_1$ together an alkylene bridge of 4 or 5 carbon atoms, i.e., both $R_1$ together with the amino nitrogen form an N-pyrrolidyl or N-piperidyl substituent; and
$R_2$ is 2-thienyl, phenyl or substituted phenyl of the formula:

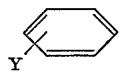

Y is halo of atomic weight of from 19 to 36, lower alkyl of 1 to 4 carbon atoms; lower alkoxy of 1 to 4 carbon atoms; or trifluoromethyl; and
$R_3$ is hydrogen, halo of atomic weight of from 19 to 36, lower alkyl of 1 to 4 carbon atoms; lower alkoxy of 1 to 4 carbon atoms; or trifluoromethyl;

(B) the N-oxides of the compounds of Formula I including the di-N-oxides; and
(C) the pharmaceutically acceptable acid addition salts of (A) and (B) above.

A preferred method for preparing the compounds of the invention involves reaction of novel compounds which are 4-(ω-aminoalkoxy)chalcones, e.g., 4-(2-diethylaminoethoxy)chalcone, with ammonium acetate and a quaternary ($R_2$)-acyl pyridinium or quinolinium halide such as phenacylpyridinium bromide in the presence of a suitable solvent, preferably acetic acid. Such preparation is illustrated below:

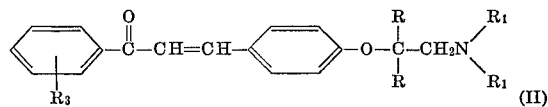

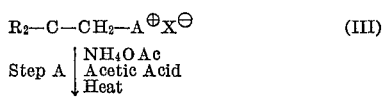

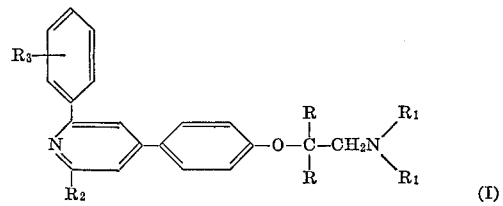

wherein R, $R_1$, $R_2$ and $R_3$ are as defined, X is halogen having an atomic weight of from 19 to 127, and A is pyridyl or quinolyl.

The production of the invention compounds of Formula I by Step A involving reaction of a compound of Formula II with a quaternary salt of Formula III and ammonium acetate is conveniently carried out at elevated temperatures in the presence of a suitable solvent, Preferably, the reaction is effected at reflux temperatures ranging usually between about 70° C. to 110° C. The especially preferred solvent for the reaction is acetic acid. Depending upon the particular conditions employed the reaction time may vary usually from about 30 minutes to 5 hours, more usually 1 to 3 hours. Compounds I are conveniently recovered in the form of an acid addition salt, preferably the hydrochloride, and, if desired, may be converted to the free base by conventional procedures. The reaction of Step A is analogous to those already described in the literature, for example, in Chem. Berichte 94, 691.

The N-oxides of the invention are preferably prepared from the compounds of the invention by procedures described in the literature and applicable to the preparation of N-oxides of compounds having both an aromatic and aliphatic nitrogen. A suitable literature reference is "Aromatic Amino Oxides," E. Ochiai, Elsevier Publishing Co. (1967). For example, the compounds of Formula I may be readily reacted with a peracid or hydrogen peroxide in a Step A–1 to obtain the di-N-oxides of the invention having the Formula IA:

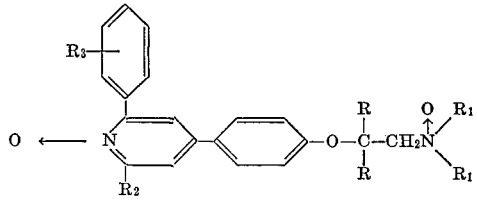

wherein R, $R_1$, $R_2$ and $R_3$ are as defined. The reaction of Step A–1 is conveniently carried out with a peracid of know type, e.g., perbenzoic acid or peracetic acid with or without an added solvent, e.g., chloroform, as may be desired or required depending upon the particular oxidizing agent, or by subjecting the compound I to reaction with hydrogen peroxide in an inert solvent, e.g., ethanol, acetic acid or acetic anhydride. The reaction of the compound I with a peracid or hydrogen peroxide in Step A–1 may be typically carried out at temperatures in the range of from room temperature (20° C.) up to 90° C. The compounds of Formula IA are more conveniently produced employing the higher range temperatures and reasonably high concentrations of the oxidizing agent.

Further in accordance with the procedures described in the literature it will be evident that the use of hydrogen peroxide under milder conditions of temperature and concentration of oxidizing agent represents a preferred combination of conditions for preparation in a Step A–2 of the N-oxides of the invention of the Formula IB:

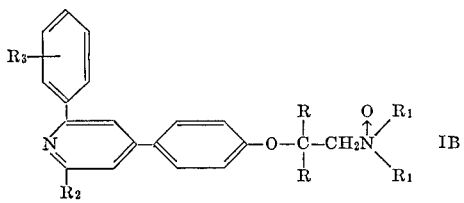

wherein R, $R_1$, $R_2$ and $R_3$ are as defined. The preparation of the N-oxides of Formula IB by Step A–2 is more typically carried out at temperatures between 15° C. to 30° C. employing the more dilute hydrogen peroxide concentrations in the reaction mixture and over a period of several days time. In general the N-oxides of the invention may be readily recovered by working up by established procedures.

Intermediate compounds (II) reacted in Step A are novel compounds which are preferably prepared by reaction of acetophenone with the desired 4-(ω-aminoalkoxy)benzaldehyde, as illustrated below:

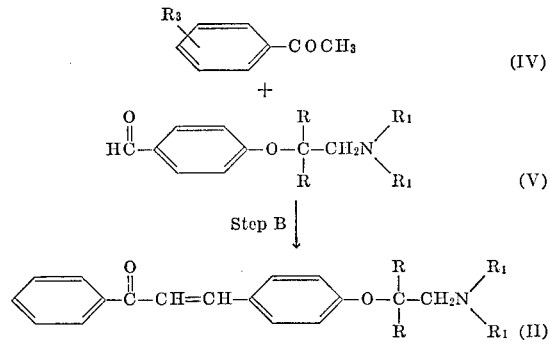

wherein R, $R_1$ and $R_3$ are as defined above.

The production of intermediate compounds II by Step B involving reaction of acetophenone with the p-substituted benzaldehyde compound V is conveniently carried out analogously to well-known procedures for preparation of chalcones, for example, as exemplified below in Example 2.

The compounds V employed in Step B for preparation of compound II are either known or can be readily prepared from available materials by established procedures, for example, as exemplified below in Example 1.

Intermediates compounds III are preferably prepared as illustrated below:

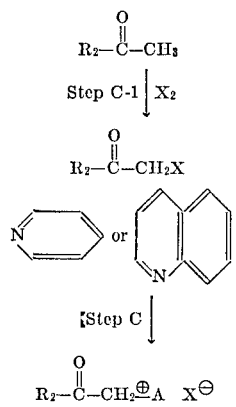

wherein $R_2$, X and A have the meaning above defined.

Step C–1 involves a conventional halogenation, preferably employing bromine to convert compound VI to its mono-halo derivative compound VII.

In Step C, the compound VII is readily reacted with pyridine or quinoline, preferably pyridine, according to conventional procedures to obtain compound III which is readily recovered in the form of the quaternary halide. A satisfactory literature reference for the reactions of both Steps C–1 and C is Chem. Berichte 94, 691.

The compounds I may be alternatively prepared by reacting in a Step D a compound of the Formula VIII:

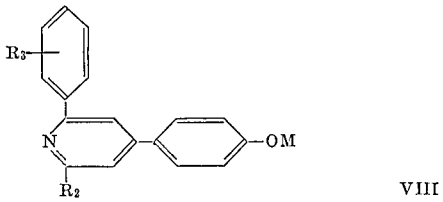

wherein $R_2$ and $R_3$ are as defined, with a compound IX which is an alpha halo derivative of or forming the desired ω-aminoalkoxy moiety and having the formula:

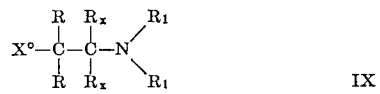

wherein R and $R_1$ are as defined, M is hydrogen or an alkali metal, preferably sodium or potassium, X° is halo of atomic weight of from 35 to 127 and both $R_x$ are both hydrogen or lower alkyl but when lower alkyl then both R are hydrogen, whereby compounds having the Formula I are obtained.

The production of compounds I by the reaction of Step D involves a synthesis of the well-known Williamson type and is conveniently carried out by reacting compounds VIII and IX at elevated temperatures suitably in the range of 30° C. to 150° C. Reflux temperatures are preferably employed and reaction times typically involve a period of from 5 to 40 hours. The reaction is preferably carried out in the presence of an inert organic solvent for the starting materials and product. Examples of such solvents include toluene, dimethylacetamide, dimethylformamide and dimethylsulfoxide, preferably toluene or the solvent in which the alkali metal salt is prepared from the corresponding p-hydroxyphenyl compound. The preparation of compounds I in which R is lower alkyl by Step D is desirably effected employing a compound IX in which $R_x$ is lower alkyl, i.e., the lower alkyl substituent is on the omega carbon atom, because such compounds IX undergo rearrangement on reaction with compounds VIII to form compounds I in which the alpha carbon substituent R is lower alkyl, as described by J. F. Kerwin et al., J.A.C.S. 69, 2961 (1947). It will be evident that compounds VIII in which M is hydrogen are converted for the Step D reaction to those in which M is an alkali metal, conveniently in situ and without separation of the alkali metal salt.

The compounds VIII and IX employed as starting material in the reaction of Step D are either known or can be prepared from known materials by procedures established in the art or described herein. A literature reference for the compounds of Formula VIII is W. Dilthey, J. Prakt. Chem. 102, 209 (1921). Compounds of Formula VIII may also be converted by known procedures to the N-oxide form thereof for use in the invention.

Also within the scope of the present invention are pharmaceutically acceptable salts not materially affecting the pharmacological effect of the compounds of Formula I and their N-oxides. Such salts include the acid addition salts, e.g., the hydrochloride, fumarate, formate, acetate, citrate, sulfonate, malonate, tartrate, methane sulfonate, salicylate and hydrosulfate. Certain acid addition salts as produced by the invention may contain alcohol of crystallization such as the lower alkanols preferably employed in certain cases. Such alkanols are also within the scope of the invention as being generally pharmaceutically acceptable. The acid addition salts may be produced as desired from the corresponding free bases by conventional procedures. Conversely the free bases may be obtained from the salts and alkanoates by procedures known in the art.

The compounds of structural Formula I and their N-oxides and the pharmaceutically acceptable acid addition salts thereof are useful because they possess pharmacological activity in animals. In particular, the compounds are useful as hypolipidemic agents, as indicated by tests on a group of white rats which are given 5-50 milligrams per kilogram of body weight per diem of the compound orally, for 6 days, followed by extraction with isopropanol of serum or plasma from the sodium hexobarbital anesthetized rat, and noting the cholesterol and triglyceride contents as compared to those of a control group. The cholesterol and triglyceride contents are determined by the methods described by Lofland, H. B., Anal. Biochem. 9:393 (1964): (Technicon method N 24a): and Kessler, G., and Lederer, H. Technicon Symposium, Mediad Inc., New York, pages 345–347 (1965), respectively. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.05 gram to about .4 gram of the compound, and the dosage forms suitable for internal use comprise from about 12.5 milligrams to about 200 milligrams of active compound in intimate admixture with a solid or liquid pharmaceutically acceptable carrier or diluent. The generally preferred compounds are those in which $R_2$ is unsubstituted phenyl and $R_3$ is hydrogen and a further preference is indicated for those compounds in which each R is lower alkyl, e.g., methyl. In general the compounds of the invention exhibit hypocholesteremic and/or hypotriglyceridemic activity depending on largely the compound used and the dosage employed with both hypocholesteremic and hypotriglyceridemic activity capable of being effected at a high level in the more preferred forms. In particular, a preferred embodiment of the invention exhibiting a high level of both such activities is represented by the compound which is 4-[4-(1,1-dimethyl-2-dimethylaminoethoxy)phenyl]-2,6-diphenylpyridine.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium searate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaoline. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
|---|---|
| 4-[4-(1,1-dimethyl-2-dimethyl-aminoethoxy)phenyl]-2,6-diphenylpyridine di-N-oxide dihydrochloride monohydrate | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1 p-(2-diethylaminoethoxy)benzaldehyde

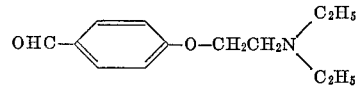

A solution of 178 g. of p-hydroxybenzaldehyde in 2.0 liters of toluene to which 450 g. of anhydrous potassium carbonate was added with stirring is refluxed for one-half hour, and there is then added thereto at reflux over the course of one hour a solution of 240 g. 2-diethylaminoethylchloride in 500 ml. toluene. Refluxing is continued for 16 hours, the mixture cooled to 25° C. and 1.0 liter of water added. After mixing for 15 minutes the organic phase is washed twice each with 1.0 liter of 1 N sodium hydroxide, then once with 1.0 liter of 5% sodium bicarbonate solution, and finally with 500 ml. of saturated sodium chloride solution. The solvent is stripped off and the oil distilled in vacuo to obtain an oil of p-(2-diethylaminoethoxy)benzaldehyde,

EXAMPLE 2

4-(2-diethylaminoethoxy)chalcone hydrochloride

A solution of 221 g. of p-(2-diethylaminoethoxy)benzaldehyde and 120 g. of acetophenone dissolved in 630 ml. of ethanol is prepared and there is added thereto 100 ml. 2 N sodium hydroxide solution with intensive stirring at room temperature (20° C.). There is then added 70 ml. of water and the resulting mixture is allowed to stand for three days at −5° C. The aqueous top layer is separated and extracted with 1.0 liter of chloroform after which the chloroform and previously separated bottom oil are combined and washed with 1.0 liter of 29% acetic acid. The solvent is stripped off and the remainder dissolved in 1.5 liters of acetone followed by addition with stirring at 15°–20° C. of 40 g. hydrogen chloride. The resulting mixture is cooled to 5° C. and filtered to recover 4-(2-diethylaminoethoxy)chalcone hydrochloride, M.P. 145°–148° C.

EXAMPLE 3

4-[4-(2-diethylaminoethoxy)phenyl]-2,6-diphenyl-pyridine dihydrochloride

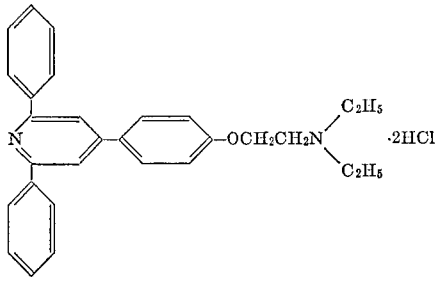

A mixture of 36.0 g. of 4-(2-diethylaminoethoxy)chalcone obtained from the product of Example 2, 27.8 g. of 1-phenacylpyridinium bromide, and 100 g. ammonium acetate in 133 ml. glacial acetic acid is refluxed for two hours. The resulting clear, red solution is concentrated in vacuo, the residue taken up in 1000 ml. water, and made alkaline (pH≅10) by addition of 50% sodium hydroxide solution. The resulting mixture is extracted three times each with 300 ml. of ether and the extracts combined, washed with saturated sodium chloride solution, and dried over anhydrous magnesium sulfate. The resulting solution is filtered and the filtrate treated with an excess of hydrogen chloride saturated ether to give an amorphous hydrochloride which is triturated with absolute ether. The salt is then dissolved in a minimum of boiling ethanol, treated with charcoal, and there is obtained a white fluffy crystalline material which is recrystallized from a minimum of boiling ethanol to obtain 4-[2-(2-diethylaminoethoxy)phenyl]-2,6-diphenylpyridine dihydrochloride containing a small amount of ethanol of crystallization which gives a clear melt at 110° C.

EXAMPLE 4

4-[4-(2-diethylaminoethoxy)phenyl]-2-phenyl-6-(2-thienyl)pyridine hydrochloride

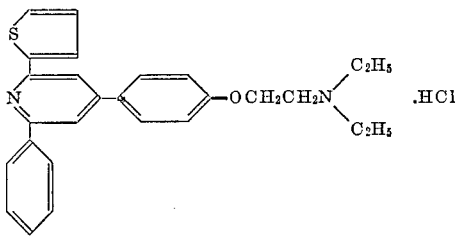

Step A.—Preparation of 1-(2-thenoylmethyl)-pyridinium bromide

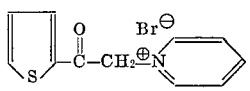

To a stirred solution of 16.3 g. α-bromoethyl 2-thienyl ketone in 300 ml. absolute diethyl ether there is rapidly added 16.3 g. absolute pyridine to obtain a brownish white microcrystalline suspension which is stirred overnight. The solid is then filtered and washed with 200 ml. absolute ether to obtain 1-(2-thenoylmethyl)pyridinium bromide.

Step B.—Preparation of 4-[4-(2-diethylaminoethoxy)phenyl]-2-phenyl-6-(2-thienyl)pyridine hydrochloride A mixture of 19.4 g. 4-(2-diethylaminoethoxy)-chalcone from the product of Example 2, 17.0 g. of 1-(2-thenoylmethyl)pyridinium bromide, and 60 g. ammonium acetate in 80 ml. acetic acid is refluxed for two hours. Distilled water in amount of 1 liter is added to the cooled reaction mixture and the resulting solution is made basic (pH≥10) with 50% sodium hydroxide solution. The alkaline solution is extracted three times each with 200 ml. ether, and the combined ethereal extracts washed with saturated sodium chloride, dried over anhydrous magnesium sulfate, and concentrated in vacuo. The resulting residue is purified by column chromatography (500 g. silica gel, eluent: chloroform/methanol (90:10)) to give a brown-oil which is taken up in 100 ml. anhydrous ether to which an ether-hydrogen chloride solution is added to obtain a brown solid. The ether is decanted and the solid triturated 5 times each with 150 ml. fresh anhydrous ether. The filtered solid is dissolved in a minimum of refluxing isopropanol, charcoaled, and filtered. A few drops of concentrated hydrochloric acid is added to the filtrate to obtain crystallized material. Two additional recrystallizations from a minimum of boiling isopropanol are followed by a final recrystallization from ethanol to which a small amount of ether is added. The solid contains a non-stoichiometric amount of ethanol of crystallization as confirmed by elemental analysis. The ethanol is removed by drying in vacuo four days at 65° C. to obtain 4-[4-(2-diethylaminoethoxy)phenyl]-2-phenyl-6-(2-thienyl)pyridine hydrochloride, M.P. 191° to 193° C.

EXAMPLE 5

4-(1,1-dimethyl-2-dimethylaminoethoxy)benzaldehyde

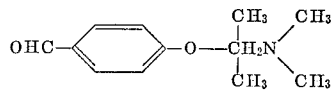

A solution of 22.4 g. of p-hydroxybenzaldehyde in 250 ml. of toluene to which 55 g. of anhydrous potassium carbonate was added with stirring is refluxed for one-half of an hour, and there is then added thereto at reflux over the course of one hour 18.9 g. of 2-dimethylamino-2-methylpropyl chloride. Refluxing is continued overnight. The resulting mixture is cooled to room temperature, filtered and the toluene removed in vacuo. The residue was taken up in 200 ml. ether and washed twice each with 50 ml. of 2 N sodium hydroxide and finally with 100 ml. of saturated sodium chloride solution. The ether solution is dried over anhydrous magnesium sulfate and concentrated under reduced pressure to an oil which was distilled to give a water-white liqued of 4-(1,1-dimethyl-2-dimethylaminoethoxy)benzaldehyde.

EXAMPLE 6

4-(1,1-dimethyl-2-dimethylaminoethoxy)chalcone

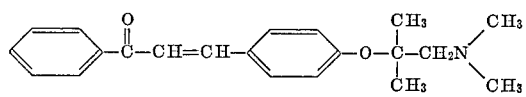

A solution of 12.3 g. of 4-(1,1-dimethyl-2-dimethylaminoethoxy)benzaldehyde and 6.74 g. of acetophenone dissolved in 100 ml. of 95% ethanol is prepared and there is added thereto 30 ml. of 25% sodium hydroxide solution with intensive stirring at room temperature for one hour. The mixture was concentrated under reduced pressure and the resulting residue was taken up in 500 ml. water. The resulting emulsion is extracted three times each with 150 ml. of ether and the combined ethereal extracts washed with 50 ml. saturated sodium chloride solution. The ether solution was then extracted twice each with 200 ml. of 10% tartaric acid and the combined acidic solution made alkaline (pH>10) with 50% sodium hydroxide solution. The alkaline solution was extracted three times each with 150 ml. ether and the combined ethereal extracts washed with 50 ml. saturated sodium chloride, solution, dried over anhydrous magnesium sulfate and concentrated under reduced pressure to give an oil which, after purification by column chromatography yields an oil of 4-(1,1-dimethyl-2-dimethylaminoethoxy) chalcone.

EXAMPLE 7

4-[4-(1,1-dimethyl-2-dimethylaminoethoxy)phenyl]-2,6-diphenylpyridine hydrochloride

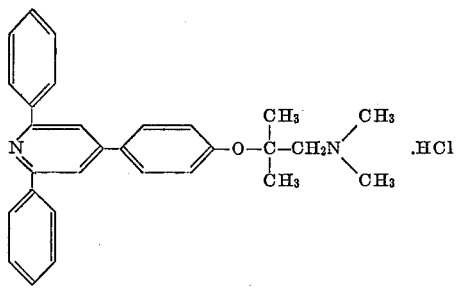

A mixture of 11.2 g. of 4-(1,1,-dimethyl-2-dimethylaminoethoxy)chalcone, 9.7 g. of phenacylpyridinium bromide, and 34.7 g. of ammonium acetate in 46 ml. glacial acetic acid is refluxed for two hours. The resulting clear, red solution is concentrated in vacuo, the residue taken up in 250 ml. water, and made alkaline (pH≥10) by addition of 50% sodium hydroxide solution. The resulting mixture is extracted three times each with 100 ml. of ether and the extracts combined, washed with saturated sodium chloride solution, and dried over anhydrous magnesium sulfate. The resulting solution is filtered and concentrated under reduced pressure to give 12 g. of an oil which is purified by column chromatography utilizing 400 g. of silica gel and chloroform as the eluent. The chromatographically pure material (10.7 g.) was taken up in 250 ml. absolute ether and treated with an excess of hydrogen chloride saturated ether to give an amorphous hydrochloride which is triturated with absolute ether. The salt is dissolved in a minimum of boiling isopropanol, treated with charcoal, and a few drops of concentrated hydrochloric acid added to filtrate to give white needles of 4-[4-(1,1-dimethyl-2-dimethylaminoethoxy)phenyl]-2,6-diphenylpyridine hydrochloride, M.P. 216–217° C.

EXAMPLE 8

4 - [4 - (1,1 - dimethyl-2-dimethylaminoethoxy)phenyl]-2,6 - diphenylpyridine di - N - oxide dihydrochloride monohydrate

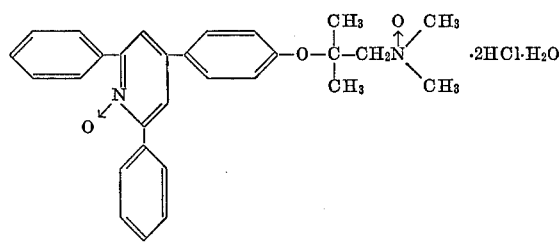

To a solution of 6.1 g. of 4-[4-(1,1-dimethyl-2-dimethylaminoethoxy)phenyl] - 2,6 - diphenylpyridine in 15 ml. of glacial acetic acid is added dropwise a total of 10.9 g. of 40% peracetic acid during which addition the temperature of the mixture increased to about 70° C. The resulting mixture is allowed to stand at 70° C. for 4 hours and is then concentrated in vacuo and the resulting oil dissolved in about 50 ml. of ethanol saturated with hydrogen chloride. This mixture is concentrated in vacuo and treated by addition of about 15 ml. of water followed by removal of excess water as a benzene-water azeotrope. The resulting oil is treated with methanol-diether to obtain at 0° C. a crystalline material which is recrystallized from methanol-chloroform (1:1) at 0° C. to obtain a microcrystalline solid which is 4-[4-(1,1-dimethyl-2-dimethylaminoethoxy)phenyl] - 2,6 - diphenylpyridine di-N-oxide dihydrochloride monohydrate, M.P. 178° C.

EXAMPLE 9

4-[4-(1,1-dimethyl-2-dimethylaminoethoxy)phenyl]-2,6-diphenylpyridine amine-N-oxide hydrochloride

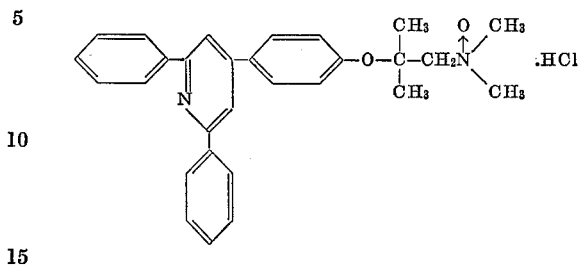

To a solution of 5.8 g. of 4-[4-(1,1-dimethyl-2-dimethylaminoethoxy)phenyl]-2,6-diphenylpyridine in 15 ml. of glacial acetic acid is added dropwise a total of 15.5 ml. of 3% hydrogen peroxide solution at room temperature. The resulting mixture allowed to stand at room temperature for 35 days during which time further separate additions of 15 ml. of 3% hydrogen peroxide solution are periodically made to make up for decomposition losses. The resulting mixture is then worked up in a conventional manner to obtain a residue which is crystallized from minimum boiling isopropanol to obtain 4-[4-(1,1-dimethyl - 2 - dimethylaminoethoxy)phenyl]-2,6-diphenylpyridine amine-N-oxide hydrochloride.

EXAMPLE 10

Following the procedure of Example 3 and employing approximately similar proportions and the appropriately substituted phenacyl-pyridinium bromide, the following compounds of the invention are prepared:

(A) 4 - [4 - (2 - diethylaminoethoxy)phenyl] - 2-(4-methoxyphenyl)-6-phenylpyridine hydrochloride (which contains ethanol and for which a melting point is not readily determined).

(B) 4 - [4 - (2 - diethylaminoethoxy)phenyl]-2-(4-trifluoromethylphenyl) - 6 - phenylpyridine hydrochloride, M.P. 146–147.3° C.

What is claimed is:
1. A compound from the group of:
(A) compounds of the formula:

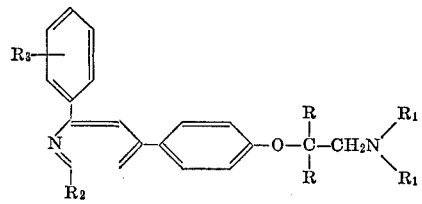

wherein each of R is, independently, hydrogen or lower alkyl;
each of $R_1$ is, independently, lower alkyl or both $R_1$ together an alkylene bridge of 4 or 5 carbon atoms;
$R_2$ is 2-thienyl, phenyl or substituted phenyl of the formula:

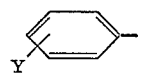

Y is halo of atomic weight of from 19 to 36, lower alkyl; lower alkoxy, or trifluoromethyl; and
$R_3$ is hydrogen, halo of atomic weight of from 19 to 36, lower alkyl; lower alkoxy, or trifluoromethyl; and
(B) the N-oxides of the compounds of (A), above; or a pharmaceutically acceptable acid addition salts of (A) and (B) above.

2. A compound of claim 1 having the formula:

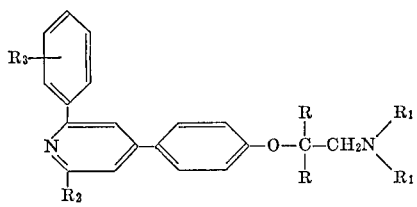

wherein R, $R_1$, $R_2$ and $R_3$ are as defined in claim 1.

3. A compound of claim 2 in which $R_2$ is phenyl and $R_3$ is hydrogen.

4. A compound of claim 3 in which each R and $R_1$ is lower alkyl of 1 or 2 carbon atoms.

5. The compound of claim 3 which is 4[4-(2-diethylaminoethoxy)phenyl]-2,6-diphenylpyridine.

6. The compound of claim 4 which is 4-[4-(1,1-dimethyl - 2 - dimethylaminoethoxy)phenyl]-2,6-diphenylpyridine.

7. A compound of claim 1 which is an N-oxide.

8. A compound of claim 7 having the formula:

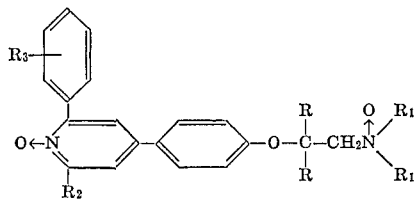

wherein R, $R_1$, $R_2$ and $R_3$ are as defined in claim 1.

9. A compound of claim 8 in which $R_2$ is phenyl and $R_3$ is hydrogen.

10. A compound of claim 9 in which each R and $R_1$ is lower alkyl of 1 or 2 carbon atoms.

11. The compound of claim 9 which is 4-[4-(2-diethylaminoethoxy)phenyl]-2,6-diphenylpyridine di-N-oxide.

12. The compound of claim 10 which is 4-[4-(1,1-dimethyl - 2 - dimethylaminoethoxy)phenyl]-2,6-diphenylpyridine di-N-oxide.

13. A compound of claim 7 having the formula:

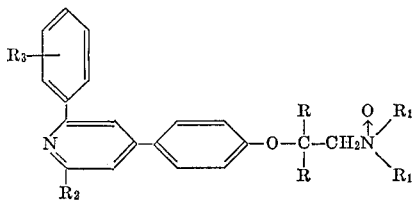

wherein R, $R_1$, $R_2$ and $R_3$ are as defined in claim 1.

14. A compound of claim 13 in which $R_2$ is phenyl and $R_3$ is hydrogen.

15. A compound of claim 14 in which each R and $R_1$ is lower alkyl of 1 or 2 carbon atoms.

16. The compound of claim 14 which is 4-[4-(2-diethylaminoethoxy)phenyl] - 2,6 - diphenylpyridine amine-N-oxide.

17. The compound of claim 15 which is 4-[4-(1,1-dimethyl - 2 - dimethylaminoethoxy)phenyl] - 2,6 - diphenylpyridine amine-N-oxide.

References Cited

UNITED STATES PATENTS

| | | | |
|---|---|---|---|
| 2,739,152 | 3/1956 | Krimmel | 260—295 |
| 3,396,169 | 8/1968 | Lednicer | 260—294.7 |
| 3,413,298 | 11/1968 | Biel et al. | 260—295 |

ALAN L. ROTMAN, Primary Examiner

U.S. Cl. X.R.

260—240, 294.7, 294.8, 295; 424—263, 266, 267